United States Patent [19]

Neuber

[11] Patent Number: 5,070,872
[45] Date of Patent: Dec. 10, 1991

[54] METERING DEVICE FOR A LUNG-DEMAND VALVE

[75] Inventor: Thomas Neuber, Lübeck, Fed. Rep. of Germany

[73] Assignee: Drägerwerk Aktiengesellschaft, Lübeck, Fed. Rep. of Germany

[21] Appl. No.: 599,027

[22] Filed: Oct. 17, 1990

[30] Foreign Application Priority Data

Oct. 17, 1989 [DE] Fed. Rep. of Germany ....... 3934559
Apr. 19, 1990 [DE] Fed. Rep. of Germany ....... 4012485

[51] Int. Cl.$^5$ ............................................. A62B 9/02
[52] U.S. Cl. .......................... 128/205.24; 128/204.26; 128/204.18; 128/207.12; 137/860
[58] Field of Search ..................... 128/205.24, 204.26, 128/200.24, 204.29, 204.18, 207.12; 251/239; 137/843, 859, 860

[56] References Cited

U.S. PATENT DOCUMENTS

| | | | |
|---|---|---|---|
| 4,071,025 | 1/1978 | Kohnke | 137/843 X |
| 4,192,298 | 3/1980 | Ferraro et al. | 128/205.24 |
| 4,207,884 | 6/1980 | Isaacson | 128/200.24 |
| 4,595,004 | 6/1986 | Czech | 128/204.21 |
| 4,616,646 | 10/1986 | Beaussant | 128/205.24 |
| 4,625,759 | 12/1986 | Craig | 128/205.24 X |
| 4,699,137 | 10/1987 | Schroeder | 128/205.24 |
| 4,889,115 | 12/1989 | Bozano | 128/204.26 |
| 5,000,174 | 3/1991 | Gray | 128/205.29 |
| 5,016,627 | 5/1991 | Dahrendorf | 128/205.24 |

FOREIGN PATENT DOCUMENTS

| | | | |
|---|---|---|---|
| 558011 | 6/1957 | Fed. Rep. of Germany | 251/239 |
| 1148040 | 5/1963 | Fed. Rep. of Germany | |
| 2628371 | 1/1977 | Fed. Rep. of Germany | |
| 466051 | 1/1969 | Switzerland | |

Primary Examiner—Edgar S. Burr
Assistant Examiner—Eric P. Raciti
Attorney, Agent, or Firm—Walter Ottesen

[57] ABSTRACT

The invention is directed to a metering device for lung-demand valves and includes prepressure compensation. The metering device includes a valve body coacting with a valve seat for metering gas and a compensating piston is arranged between a primary pressure chamber and a secondary pressure chamber for transmitting the compensating force to the valve body. The compensating piston is guided in a compensating housing. The metering device is improved in that the compensating piston is movable without friction and a seal is easily secured. For this purpose, a membrane made of elastic material defines the seal unit. The membrane is tightly held and has a cylindrical side wall which is fixed in the compensating housing. The membrane has regions of reduced wall thickness on the periphery of the side wall and these regions are subdivided into segments or extend as one continuous portion around the periphery. The regions of reduced wall thickness act as a sealing lip.

7 Claims, 2 Drawing Sheets

METERING DEVICE FOR A LUNG-DEMAND VALVE

FIELD OF THE INVENTION

The invention relates to a metering device for lung-demand valves. The metering device incorporates prepressure compensation and has a valve body for metering gas and a compensating piston arranged between a primary pressure chamber and a secondary pressure chamber for transmitting the compensating force to the valve body. The compensating piston is guided in a compensating housing and is sealed by a seal arrangement.

BACKGROUND OF THE INVENTION

A pressure-control valve having prepressure compensation is disclosed in published German patent application DE-OS 26 28 371. The valve is disposed between a primary pressure chamber and a secondary pressure chamber and includes a valve body lying in contact engagement with a valve seat. The valve is connected to a movable pin which functions as a compensating piston. The prepressure compensation takes place in such a manner that two channels branch from the supply connection for the primary pressure. On the one hand, the channels apply pressure to the valve body and on the other hand, to the compensating piston. The primary pressure acting via the first channel on the compensating piston presses the valve body against the valve seat while the primary pressure present in the second channel generates an oppositely directed force on the valve body. Complete compensation is then present when the cross-sectional surface of the compensating piston charged with the primary pressure is equal to the clear cross-sectional surface of the valve seat so that, in this way, there is a force balance between the resulting primary pressure forces acting in the axial direction. The compensating piston is guided in a cylindrical bore and is sealed with an O-ring as a sealing unit.

Swiss patent 466,051 discloses a lung-controlled prepressure compensated compressed air ventilating apparatus that includes a valve body and a compensating piston which are rigidly connected to each other. The primary pressure acts on the valve body as well as on the compensating piston so that the resulting axial forces are in balance. The compensating piston is guided in a cylindrical bore of a compensating housing disposed between the primary pressure chamber and the secondary pressure chamber and is seated in a gas-tight manner with a sealing unit in the form of an O-ring seal. To open the valve, a tilt lever connected to the control membrane presses against the compensating piston with the valve body moving into the open position. The pressure gas then flows from the primary pressure chamber into the secondary pressure chamber.

With these apparatus, it is a disadvantage that frictional forces have to be overcome for displacing the compensating piston with the friction forces being caused essentially by the O-ring seal on the compensating piston. The friction force is furthermore influenced by the primary pressure acting on the sealing ring. Because of the so-called slip-stick effect on the sealing unit, pressure fluctuations occur on the secondary pressure side for static as well as dynamic loads. The pressure fluctuations make the operation of metering apparatus and especially of breathing-controlled metering apparatus difficult.

Published and examined German patent application DE-AS 11 48 040 discloses a pressure-reducing valve having a pressure-compensated compensating piston which is seated in the compensating housing with a sealing arrangement in the form of a folded-over seal. A disadvantage of this arrangement is that for securing and sealing the folded-over seal in the compensating housing, a valve disc is required which presses the attachment bead of the seal into a cut-away portion of the cylindrical wall of the compensating housing. The assembly of the seal is made difficult by the introduction of the valve disc.

SUMMARY OF THE INVENTION

It is an object of the invention to improve a metering device for a lung-demand valve having prepressure compensation so that the compensation piston disposed in a sealing arrangement can be moved without friction. It is a further object of the invention to provide a metering device wherein the sealing arrangement can be a easily secured and reliably held in position without the aid of ancillary means.

According to a feature of a first embodiment of the invention, the sealing medium is a cup-shaped membrane disposed so as to be stationary in the compensating housing. The cup-shaped membrane separates the primary pressure chamber from the secondary pressure chamber. The base wall of the membrane is configured as a membrane portion and at least this base wall is made of a movable elastic material. The compensating piston is actuable by means of the base wall of the membrane.

The advantages obtained with the invention are seen essentially in that it is unnecessary to provide an O-ring seal disposed on the periphery of the compensating piston. Instead, an elastic cup-shaped membrane is utilized which separates the pressure chambers from each other and thereby assumes a sealing function while at the same time permitting the compensating piston to be actuated for primary pressure compensation. The compensating piston can now be guided friction free in a clearance fit since the sealing function has been transferred to the cup-shaped membrane. Accordingly, the compensating piston is no longer burdened with the problem of a rubbing sealing unit. The primary pressure compensation takes place in that the base wall of the membrane deflects outwardly under the primary pressure and thereby presses the compensating piston against the valve body.

The primary pressure acts on the valve body as well as on the membrane. A complete primary pressure compensation is then present when the resulting axial primary pressure forces are in equilibrium.

A special advantage of the cup-shaped membrane is that this membrane can be seated without attachment means because the membrane is accommodated in a bore which is likewise cylindrical and has a stop and receives the pressing force (by means of the primary pressure) required on all sides for the seal.

In contrast to the cup-shaped membrane, a flat membrane disc would require a complex pressure-resistant clamping at its periphery which would be difficult to realize for small diameters. The cup-shaped membrane also permits a compact assembly of the unit and this is especially advantageous for breathing-controlled metering valves which must be taken along by persons carrying the apparatus.

For metering pressure gas, a tilt lever is provided between the base wall of the cup-shaped membrane and the compensating piston. This tilt lever is pivotably journalled at a pivot point and is operatively connected to a control membrane. If the control membrane is deflected by a control medium such as by an underpressure in the secondary pressure chamber, then the tilt lever displaces the valve body into the open position via the compensating piston and pressure gas flows from the primary pressure chamber into the secondary pressure chamber. The base wall of the cup-shaped membrane deflects under the action of the primary pressure and follows the movement of the tilt lever. The pressure compensation is thereby continuously effective. Since sealing means are no longer required on the compensating piston, the piston can be guided without friction in a clearance fit. When the secondary pressure chamber is sufficiently filled with gas, the control membrane returns to the initial position and the valve body is again in its closed position.

If a complete primary pressure compensation is to be obtained, then the diameter of the base wall of the cup-shaped membrane facing toward the secondary pressure chamber should be so dimensioned that it corresponds to the clear diameter of the valve seat because, for a complete pressure compensation, the resulting axial primary pressure forces acting on the valve body are in equilibrium.

It is advantageous to seat the cup-shaped membrane in a cylindrical bore in the housing having a stop at the base wall since a self-seal is obtained by means of the primary pressure. This pressure presses the cylindrical side wall of the membrane against the bore surface as well as the base wall against the stop. The stop is a simple measure for holding the membrane in the housing. Additional threaded fasteners or clamping devices which were necessary for disc-shaped membranes are not required. The introduction of the cup-shaped membrane is facilitated if the cylindrical side wall of the membrane is slightly conical and configured so as to taper toward the base wall.

It is advantageous to make the cylindrical side wall of the cup-shaped membrane from a movable elastic material. If the cup-shaped membrane is seated in the bore in the compensating housing, then the cylindrical side wall lies against the contour of the bore under the action of the primary pressure so that a self-sealing condition is obtained. To improve self-sealing, the cylindrical portion of the cup-shaped membrane is overdimensioned so that it is seated pretensioned in the bore.

According the another advantageous embodiment of the cup-shaped membrane, the edge region of the membrane is provided with a peripheral bead defining the side wall thereof. The bead is accommodated in a corresponding slot in the compensating housing. The membrane portion can then be assembled in a simple manner since the bead snaps into the corresponding slot.

For reinforcing the bead, spring elements can be provided in the edge region and can be embedded in the form of a plurality of pieces distributed around the periphery or they can be embedded as a spring ring.

If a large membrane displacement is required, then it is advantageous to provide the base wall with an arcuate depression facing into the primary pressure chamber. In this way, an excessive overextension of the membrane base wall for large position strokes is avoided.

According to another embodiment of the invention, an annular membrane made of elastic material is provided as a sealing arrangement. This membrane has a cylindrical lateral wall firmly in the compensating housing and individual regions of reduced wall thickness which act as a sealing lip. The sealing lip can be a single sealing lip or the sealing lip can be subdivided into segments.

The advantages obtained with the invention are seen essentially in that in lieu of the O-ring seal located on the periphery of the compensating piston, an elastic annular membrane is seated in the compensating housing and separates the pressure chambers from each other and performs the sealing function via the regions of the cylindrical lateral wall which are reduced in wall thickness. The compensating piston can then be guided without friction in a clearance fit in the compensating housing since the sealing function is transferred to the annular membrane and the compensating piston is no longer burdened with the problem of a sliding seal location.

The primary pressure acts on the valve body as well as on the annular membrane. A complete primary pressure compensation is then present when the resulting axial primary pressure forces are in equilibrium.

A special advantage of the annular membrane is that this membrane can be seated without attachment means since it is received in a bore which is likewise cylindrical and a polydirectional pressing force which is needed for the seal, is developed by the primary pressure and is applied to the membrane. The seal of the annular membrane in the cylindrical bore is provided by the individual regions of reduced wall thickness in the cylindrical portion of the wall of the membrane. These regions are subdivided into segments or are in the form of one continuous portion and they operate as sealing lips and are pressed against the bore wall by the primary pressure.

The regions of reduced wall thickness can be configured with groove-shaped recesses or one or more circumferential slots. On the other hand, the regions of reduced wall thickness in the simplest case can be formed as a bead at the outermost edge of the annular membrane. The segments can be of circular shape or rod shaped with the groove-shaped recesses being preferred on the inner side of the side wall of the annular membrane. In addition, the annular membrane permits a compact configuration of the metering device. This is especially advantageous for breathing-controlled metering valves which must be taken along by a person carrying the apparatus.

For metering pressure gas, a tilt lever is provided for coacting with the compensating piston and is pivotably journalled at a pivot point and is also operatively connected to the control membrane. The control membrane can be deflected by a control medium such as underpressure in the secondary pressure chamber. If the control membrane is deflected in this manner, the tilt lever displaces the valve body into the open position via an eccenter and pressure gas flows from the primary pressure chamber into the secondary pressure chamber. The base wall of the annular membrane deforms and follows the movement of the eccenter. When the secondary pressure chamber is adequately filled with gas, then the control membrane returns to its initial position and the valve body is again in its closed position.

It is advantageous to seat the annular membrane in a cylindrical bore in the compensating housing with a stop formed in the bore being in abutting contact engagement with the base wall of the membrane. The stop is a simple measure for blocking the annular membrane in the compensating housing. In addition, threaded fasteners or clamping devices which were necessary for a disc-shaped membrane are not required. The introduction of the annular membrane is facilitated when the cylindrical side wall of the annular membrane is configured so as to be slightly conical and so as to be tapered toward the base wall of the membrane.

A spring is provided for pressing the valve body against the valve seat in the cylindrical bore of the compensating housing. The spring braces against a projection in the bore and on the compensating piston via the inner surface of the base wall of the annular membrane. The base wall of the membrane is pressed against the compensating piston by the spring and in this way strengthens the sealing effect in this region.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
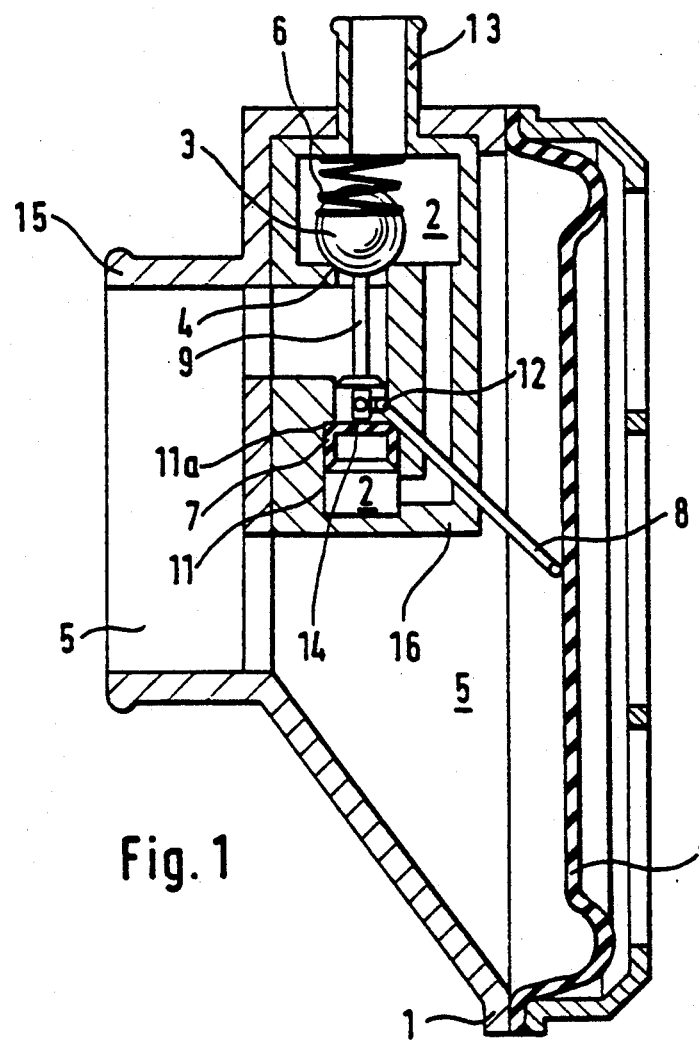
FIG. 1 is a side elevation view, partially in section, of a metering device having a cup-shaped membrane.

FIG. 1 shows a breathing-controlled metering valve in a housing 1 having a first connection 15 connected to a breathing mask (not shown) and a primary pressure connection 13 connected to a pressure gas supply (not shown).

The primary pressure chamber 2 is charged with pressure gas. The pressure gas can pass into a secondary pressure chamber 5 via a valve comprising a valve seat 4 and a valve body 3. The valve body 3 is pressed against the valve seat 4 by a spring 6.

A compensating piston 9 and a cup-shaped membrane 7 are disposed on one side of the valve body 3 opposite the spring 6. The compensating piston 9 is actuable via a tilt lever 8 and the cup-shaped membrane 7 functions to compensate for primary pressure at the valve body 3. The cup-shaped membrane 7 is inserted in a cylindrical bore in the compensating housing 16 so as to be self-sealing; that is, the membrane 7 is pressed by the primary pressure against the cylindrical wall of the bore 11 as well as against the stop 11a. Special attachment means as required in the case of a disc-shaped membrane are not required.

The primary-pressure compensation takes place in that the force acting on the valve body 3 by the primary pressure acts against a compensating force which is generated by the membrane 7 which likewise communicates with the primary pressure chamber 2 and which is transmitted to the valve body 3 via the tilt lever 8 and the compensating piston 9. A complete compensation of the force on the valve body 3 generated by the primary pressure is then provided when the diameter of the base wall 14 of the cup-shaped membrane 7 facing toward the secondary pressure chamber 5 is the same as the clear diameter of the valve seat 4. In this way, only the spring force of the spring 6 is present as a resulting force on the valve body 3. If the control membrane 10 is deflected into the interior of the housing by a control medium such as an underpressure in the secondary pressure chamber 5, then the valve body 3 is lifted from the valve seat 4 by the tilt lever 8 and the compensating piston 9. The base wall 14 then deflects arcuately in an upward direction under the action of the pressure in the primary pressure chamber 2 and thereby follows the movement of the tilt lever 8 and the compensating piston 9. In this way, the compensating force is continuously effective on the valve body 3. Since the seal between the primary pressure chamber 2 and the secondary pressure chamber 5 takes place only via the cup-shaped membrane 7, the compensating piston 9 can be guided in a friction-free manner in a clearance fit. If sufficient gas reaches the secondary pressure chamber 5 and the underpressure is reduced, the tilt lever 8 and therefore the valve body 3 return to the initial position.

For the seal of the valve body 3 on the valve seat 4, it is advantageous to either introduce a circularly-shaped sealing means onto the valve seat 4 or coat the valve body 3 with an elastomer. It is especially advantageous to configure the valve body 3 so as to have a spherical shape.

Figure 2:
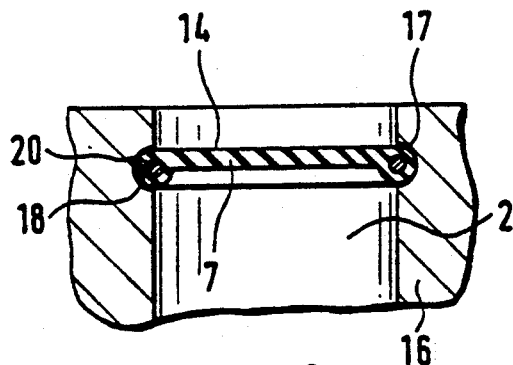
FIG. 2 is a side elevation view, in section, of an embodiment of the cup-shaped membrane having a peripheral bead with a spring element embedded therein.

FIG. 2 shows a cup-shaped membrane 7 having a base wall 14 defining a peripheral region at which a bead 17 extends around the periphery of this region. A spring element 20 is integrated into the bead 17. A peripheral slot 18 is formed in the compensating housing 16 for receiving the bead 17 therein.

Figure 3:
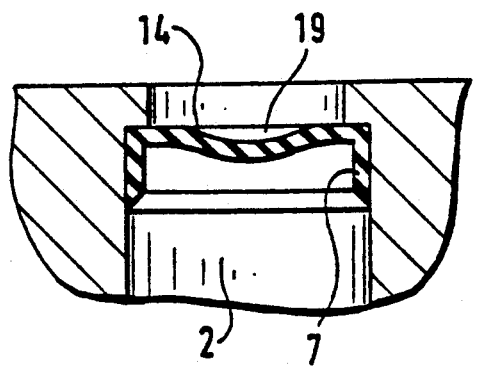
FIG. 3 is another embodiment of the cup-shaped membrane, in section, having an end wall provided with a arcuate depression facing into the primary pressure chamber.

FIG. 3 shows another embodiment of the cup-shaped membrane having a base wall 14 which, in turn, has an arcuate depression 19 extending into the primary pressure chamber 2. This embodiment is advantageous when large positioning strokes are to be carried out and when it is intended to prevent an overexpansion of the base wall 14.

Figure 4:
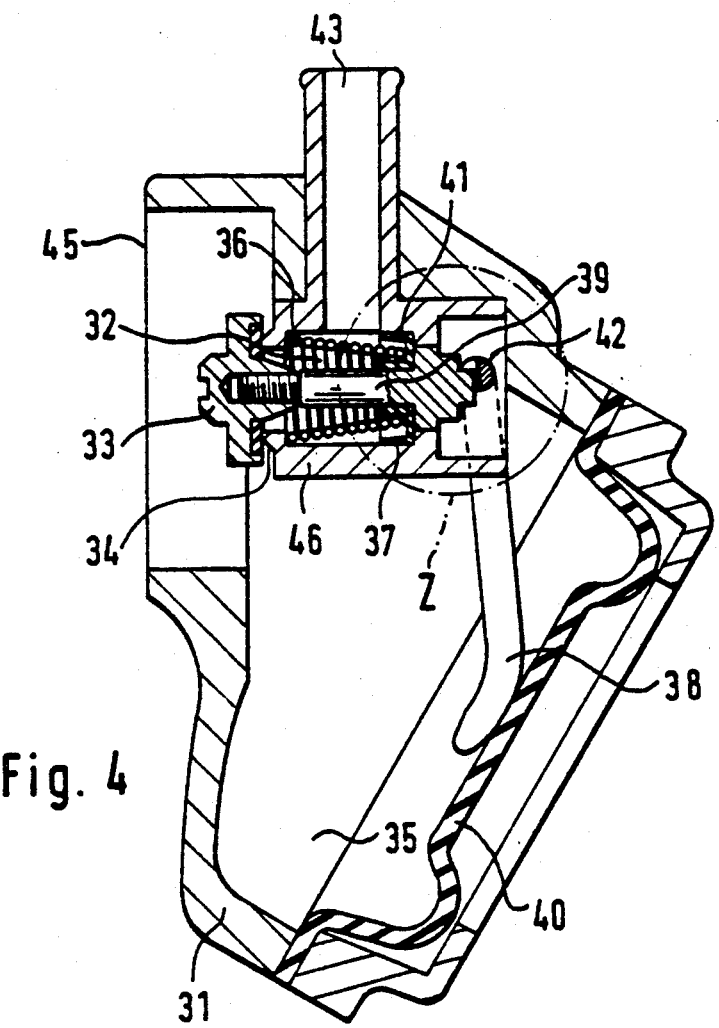
FIG. 4 is a side elevation view, partially in section, of a breathing-controlled metering device having an annular membrane; and, FIG. 5 is an enlarged view of the detail enclosed by circle Z of the metering device shown in FIG. 4.

FIG. 4 shows a breathing-controlled metering device in a housing 31 having a first connection 45 and a primary pressure connection 43. The connection 45 is connected to a breathing mask (not shown) and the primary pressure connection 43 is connected to a pressure-gas supply (not shown). The primary pressure chamber 32 in charged with pressure gas via the primary pressure connection 43. The pressure gas passes into a secondary pressure chamber 35 via a valve comprising a valve seat 34 and a valve body 33. The valve body 33 is pressed by a spring 36 against the valve seat 34.

A compensating piston 39 is disposed on the opposite side of the valve body 33 and is actuable via a tilt lever 38. An annular membrane 37 is also disposed on the opposite side of the valve body 33 and is provided for compensating for primary pressure at this valve body. The tilt lever 38 is pivotably journalled at a pivot point 42 with the angular movement of the lever being converted into translatory movement in the direction of compensating piston 39 via eccentric 51. The annular membrane 37 is seated in a cylindrical bore in the compensating housing 16 and is pressed by the primary pressure against the cylindrical wall of the bore as well as against the stop 41.

The compensation of primary pressure takes place in that the force on the valve body 33 which is effected by the primary pressure is counteracted by a compensating force which arises at the annular membrane 37 and is guided via the compensating piston 3) to the valve body 33. The control membrane 40 can be deflected by a control medium such as underpressure in the secondary pressure chamber 35. If the control membrane 40 is deflected in this manner into the housing interior, then the valve body 33 is lifted from the valve seat 34 by the eccentric 51 connected to the tilt lever 38 and by the compensating piston 39. The compensating force is continuously effective on the valve body 33. The seal between the primary pressure chamber 32 and the secondary pressure chamber 35 is effected exclusively via the annular membrane 37. For this reason, the compensating piston 39 can be guided without friction in a clearance fit of the compensating housing 16. If sufficient gas reaches the secondary pressure chamber 35 and the underpressure is reduced, then the tilt lever 38 and therefore the valve body 33 return to the initial position.

It is advantageous to coat the valve body 33 with an elastomer to provide a seal of the valve body 33 on the valve seat 34.

Figure 5:
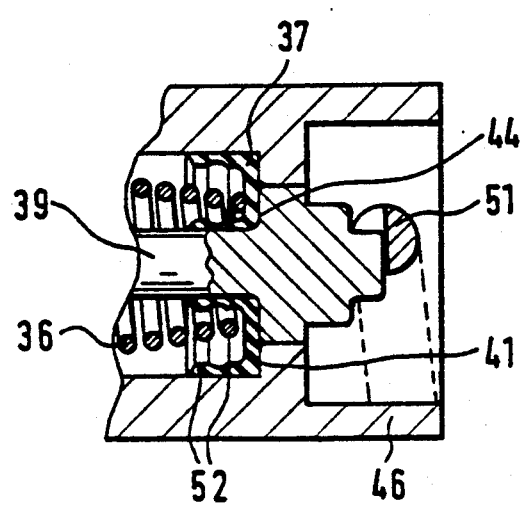

FIG. 5 shows the detail Z of the metering device of FIG. 4. The annular membrane 37 is seated in a cylindrical bore in the compensating housing 46 and abuts with the base wall 44 against the stop 41. The cylindrical side wall of the annular membrane 37 is provided with slot-shaped circumferential regions of reduced wall thickness which act as sealing lips 52 and effect the seal under the action of the primary pressure in the primary pressure chamber 32. The region of reduced wall section is, in the simplest case, a bevel at the outer end of the cylindrical annular membrane 37.

It is understood that the foregoing description is that of the preferred embodiments of the invention and that various changes and modifications may be made thereto without departing from the spirit and scope of the invention as defined in the appended claims.

What is claimed is:

1. A metering device for a lung-demand valve, the metering device comprising:
   gas supply means for supplying gas under pressure;
   a housing defining a primary pressure chamber communicating with said gas supply means and a secondary pressure chamber;
   a valve for metering gas from said primary pressure chamber into said secondary pressure chamber, said valve including a valve seat and a valve body subjected to the force of the gas in said primary pressure chamber; said valve body being displaceable between a valve-closed position wherein said valve body is seated on said valve seat and a valve-open position wherein said valve body is lifted away from said valve seat so as to permit gas to pass from said primary pressure chamber to said secondary pressure chamber;
   a membrane made of elastic material for effecting a seal between said pressure chambers;
   a force-transmitting member displaceably mounted in said housing and being connected to said valve body;
   said force-transmitting member and said housing conjointly defining a clearance interface extending between said chambers wherein said force-transmitting member is displaceable substantially without friction relative to said housing;
   said primary pressure chamber having a wall surface portion disposed in surrounding relationship to said clearance interface; and,
   said membrane being disposed in said primary chamber so as to be subjected to the pressure of the gas of said gas supplying means to develop a sealing force and said membrane being mounted at said interface so as to impart said sealing force to said force-transmitting member and to said wall surface portion thereby effecting a seal of said interface between said chambers.

2. The metering device of claim 1, said membrane having a base wall disposed at said interface and first and second side walls being in contact engagement with said wall surface portion and said force-transmitting member, respectively.

3. The metering device of claim 2, said housing defining a cylindrical bore extending between said chambers; and, said bore having a step formed therein to define a stop for receiving said base wall of said membrane thereagainst.

4. The metering device of claim 3, further comprising a spring arranged in said bore so as to be interposed between said force-transmitting member and said housing for resiliently biasing said valve body into said valve-closed position.

5. The metering device of claim 4, said force-transmitting member having a step formed therein for receiving a portion of said base wall of said membrane thereagainst; and, said spring having a first end braced against said housing and a second end braced against said portion of said base wall.

6. The metering device of claim 2, said side walls of said membrane each defining a conical surface tapering downwardly to said base wall.

7. The metering device of claim 2, at least a portion of each of said side walls having a wall thickness less than the wall thickness of said base wall to define a sealing lip.

* * * * *

UNITED STATES PATENT AND TRADEMARK OFFICE
CERTIFICATE OF CORRECTION

PATENT NO. : 5,070,872

DATED : December 10, 1991

INVENTOR(S) : Thomas Neuber

It is certified that error appears in the above-identified patent and that said Letters Patent is hereby corrected as shown below:

In column 6, line 63: delete "16" and substitute -- 46 -- therefor.

In column 7, line 1: delete "3)" and substitute -- 39 -- therefor.

In column 7, line 14: delete "16" and substitute -- 46 -- therefor.

Signed and Sealed this

Sixteenth Day of March, 1993

Attest:

STEPHEN G. KUNIN

*Attesting Officer*   Acting Commissioner of Patents and Trademarks